Jan. 9, 1934.   G. T. ELLIS   1,943,216
THEFT PREVENTIVE DEVICE FOR AUTOMOBILES
Filed Jan. 9, 1933   3 Sheets-Sheet 1
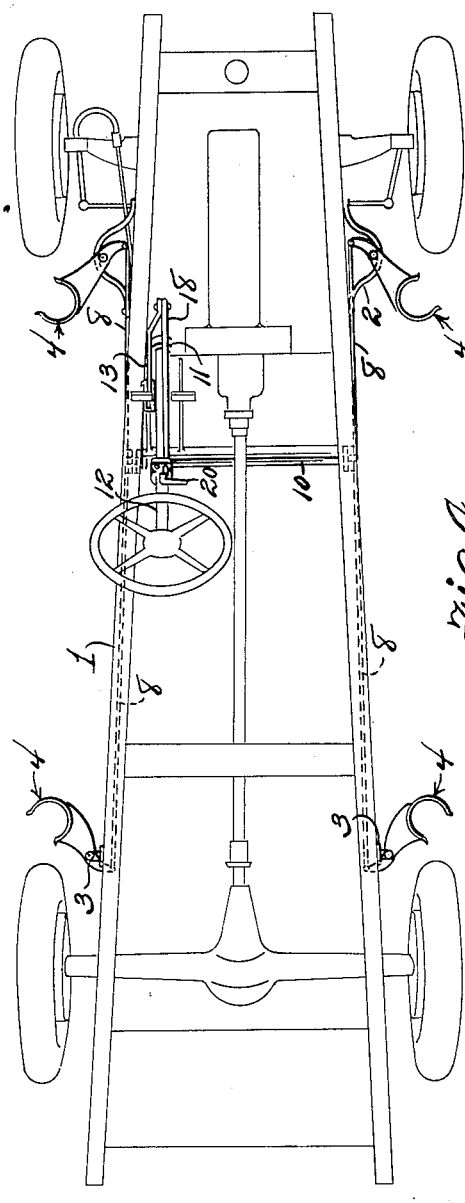
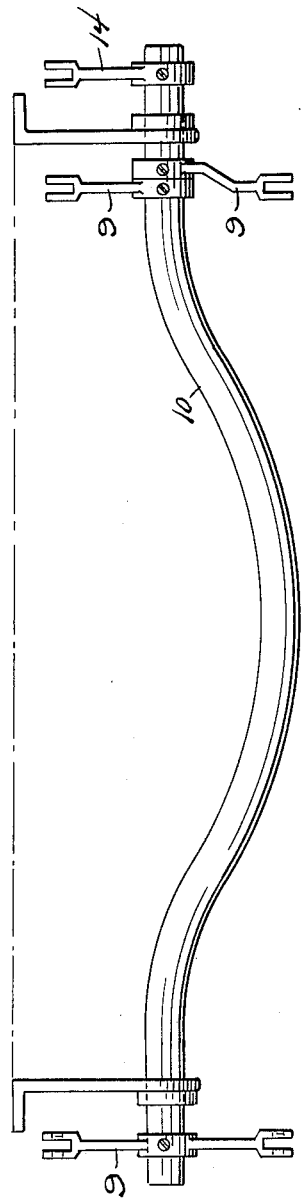
George Travis Ellis
INVENTOR
BY Victor J. Evans & Co.
ATTORNEY Jan. 9, 1934.　　　　　G. T. ELLIS　　　　　1,943,216

THEFT PREVENTIVE DEVICE FOR AUTOMOBILES

Filed Jan. 9, 1933　　　3 Sheets-Sheet 2

George Travis Ellis
INVENTOR

BY Victor J. Evans & Co.
ATTORNEY

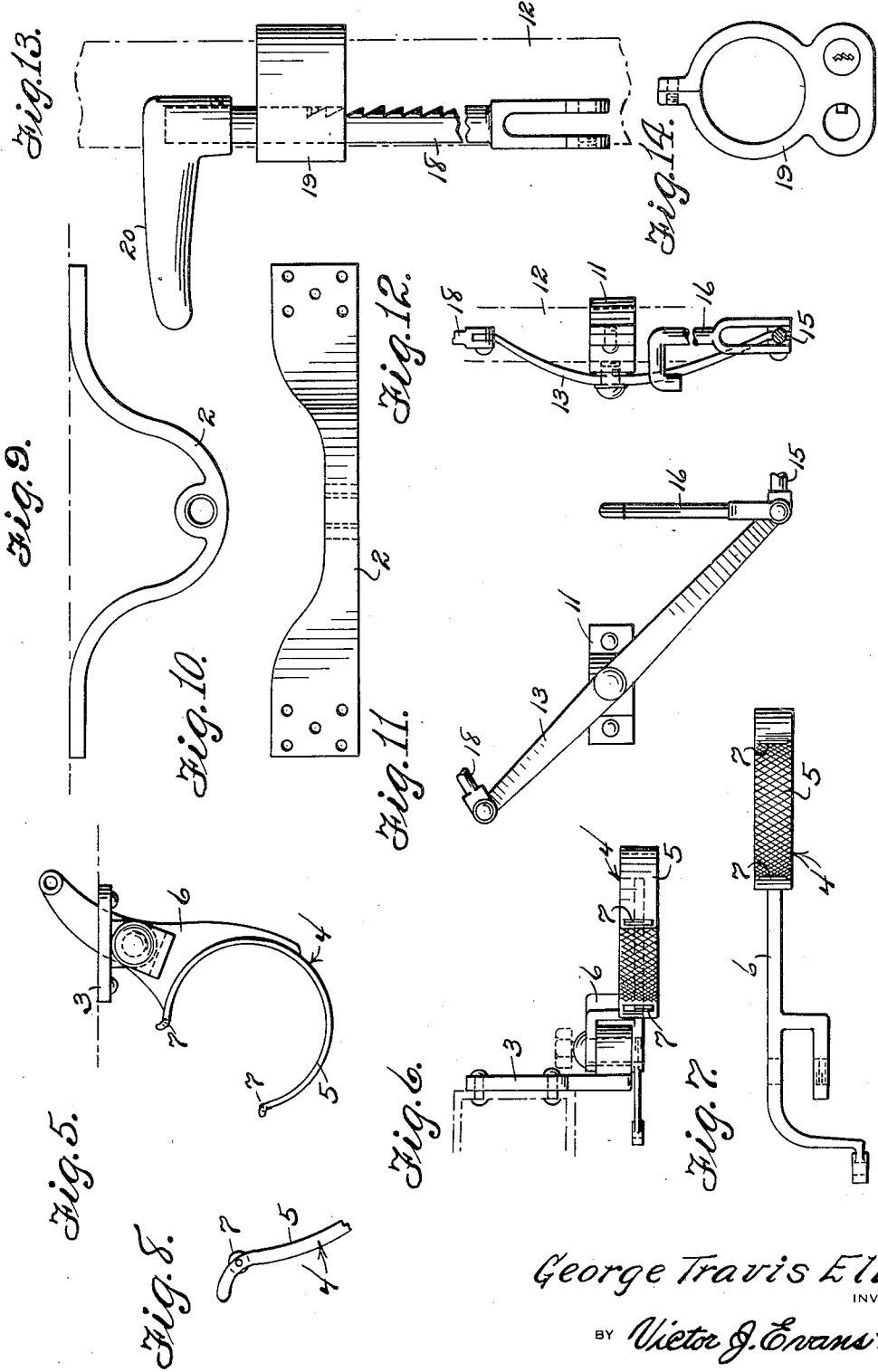

Patented Jan. 9, 1934

1,943,216

UNITED STATES PATENT OFFICE 1,943,216

THEFT PREVENTIVE DEVICE FOR AUTOMOBILES

George T. Ellis, Trenton, N. J.

Application January 9, 1933. Serial No. 650,929

3 Claims. (Cl. 192—13)

This invention relates to theft preventive devices for automobiles and has for the primary object, the provision of a device of the above stated character which is easily applicable to any automobile and may be conveniently actuated from a place within the automobile to lock the latter in entirety against theft and also the theft of any one of the tires on the wheels of the automobile, and further prevent towing of the automobile.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a plan view illustrating an automobile chassis with a theft preventive device applied thereto and constructed in accordance with my invention.

Figure 4 is a transverse sectional view showing an operating shaft and its mounting to the chassis.

Figure 5 is a detail plan view illustrating one of the tire and wheel engaging elements.

Figure 6 is a fragmentary side elevation illustrating one of the wheel and tire engaging elements and its mounting to the frame.

Figure 7 is a side elevation illustrating one of the tire and wheel engaging elements removed from its mounting.

Figure 8 is an enlarged fragmentary view showing a roller carried by the tire and wheel engaging element.

Figure 9 is a plan view illustrating the mounting or supporting bracket for one of the tire and wheel engaging elements.

Figure 10 is a side elevation illustrating the same.

Figure 11 is a side elevation illustrating an operating lever.

Figure 12 is a fragmentary plan view illustrating the operating lever and the clutch engaging arm connected thereto.

Figure 13 is an enlarged fragmentary view illustrating the actuating member associated with a lock mechanism.

Figure 14 is a plan view illustrating the lock and its attaching bracket.

Figure 2:
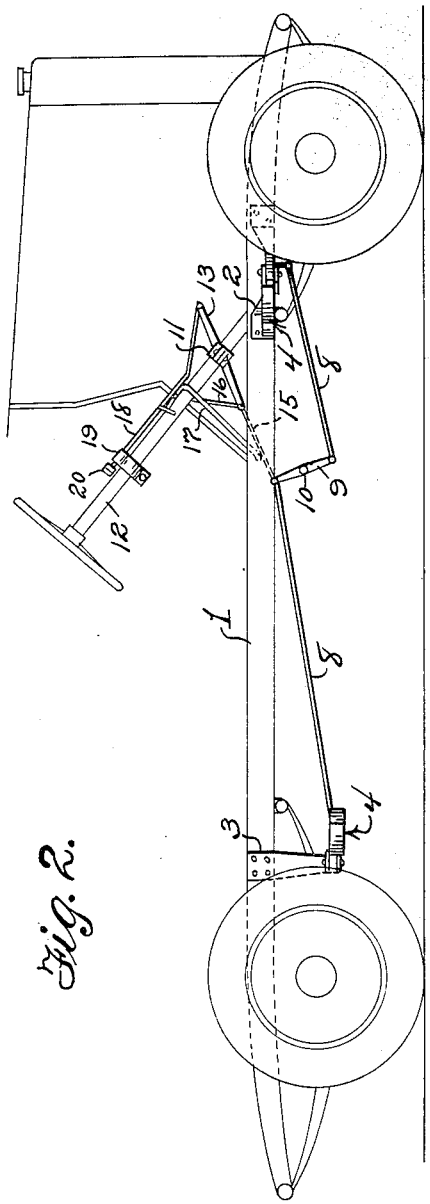
Figure 2 is a side elevation illustrating the same with the theft preventive device in an unlocked position.
Figure 3:
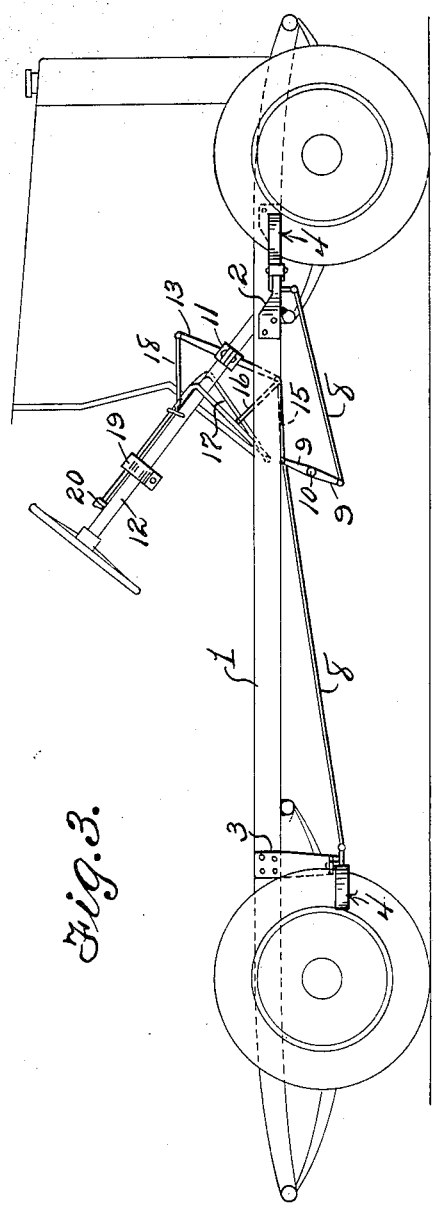
Figure 3 is a similar view showing the theft preventive device in a locked position.

Referring in detail to the drawings, the numeral 1 indicates an automobile chassis having secured to the frame thereof adjacent the front and rear wheels supporting brackets 2 and 3, respectively. Pivoted to the brackets are tire and wheel engaging elements 4 each including a substantially semi-circular element 5 formed integrally with an arm 6 pivoted to its respective bracket. Rollers 7 are carried by the semi-circular shaped member 5, adjacent the ends of the semi-circular shaped member to facilitate the movement of said member onto and off of a tire and its respective rim. The arms 6 of the tire and wheel engaging members 4 are pivotally connected to rods 8 which are in turn pivoted to arms 9 of an operating shaft 10 journaled to and arranged transversely of the frame of the chassis. A bracket 11 is secured to the steering post 12 of the chassis 1 and pivotally supports a lever 13, one end of which is connected to an arm 14 secured to the shaft 10 by a link 15, said end of the lever 13 having pivoted thereto a hook-shaped element 16, the bill portion of which engages over the clutch pedal 17 of the chassis. The other end of the lever 13 is pivotally connected to an operating rod 18 slidably supported to the steering post by a lock mechanism 19 and carrying at its upper end a finger piece 20. The lock mechanism 19 consists of a bracket attached to the steering post with the operating rod movable therethrough and provided with means to receive a key actuated lock wherein the plunger thereof may be moved to engage with teeth on the operating rod for the purpose of locking the latter against sliding movement.

In operation, the operating rod is first freed by manipulating the lock with its proper key and then moved upwardly, imparting motion to the lever 13 which causes the clutch to be disengaged by depressing the clutch pedal 17 and also swinging the tire and wheel engaging elements 4 to engage the tires and rims of the wheels with sufficient force to substantially lock the wheels against rotation and thereby prevent unauthorized removal of the automobile by towing and also preventing the removal of any of the tires from the wheels. Therefore, it will be seen that a very efficient and effective means has been provided to prevent theft of the automobile either by towing or operation under its own power and also prevent theft of any of the tires from the wheels of the automobile, it being understood that when the operating rod 18 is moved upwardly to effect locking of the automobile that the lock mechanism 19 is actuated to prevent movement of the operating rod in a reverse direction and which operation can only be effected by a person having the proper key to the lock.

While I have shown and described the preferred embodiment of my invention, it will be understood that minor changes in construction, combination and arrangement of parts may be made without departing from the spirit and scope of my invention, as claimed.

Having described the invention, I claim:

1. In combination with an automobile chassis pivotally mounted tire and wheel engaging elements on the chassis, means for engaging and disengaging said elements with the tires and wheels of the chassis, means for locking said first means, and means for effecting disengagement of the clutch by said first means and during engagement of the elements with the tires and wheels of the chassis.

2. In combination with an automobile chassis, brackets on said chassis, tire and wheel engaging elements pivoted to said brackets, an operating shaft journaled to the chassis, means connecting said elements to the shaft, an operating rod carried by the chassis and connected to the shaft, means for locking the operating rod, and means engaging the clutch pedal and operated by said operating rod to disengage the clutch during the application of the tire and wheel engaging elements to their respective tires and wheels of the chassis.

3. In combination with an automobile chassis, tire and wheel engaging elements pivotally mounted on the chassis, an operating rod movably mounted on the chassis, a lever pivoted to the chassis, means connecting said lever to the tire and wheel engaging elements, means connecting said lever to the operating rod, a hook-shaped element pivotally connected to the lever and engaging the clutch pedal, and means for locking the operating rod.

GEORGE T. ELLIS.